US006816970B2

(12) United States Patent
Morgan et al.

(10) Patent No.: US 6,816,970 B2
(45) Date of Patent: *Nov. 9, 2004

(54) SECURITY METHOD AND SYSTEM FOR PERSISTENT STORAGE AND COMMUNICATIONS ON COMPUTER NETWORK SYSTEMS AND COMPUTER NETWORK SYSTEMS EMPLOYING THE SAME

(75) Inventors: Stephen P. Morgan, San Jose, CA (US); Lance W. Russell, Hollister, CA (US); Benjamin Clay Reed, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 591 days.

This patent is subject to a terminal disclaimer.

(21) Appl. No.: 09/759,901

(22) Filed: Jan. 12, 2001

(65) Prior Publication Data

US 2001/0001876 A1 May 24, 2001

Related U.S. Application Data

(63) Continuation of application No. 08/988,850, filed on Dec. 11, 1997, now Pat. No. 6,185,685.

(51) Int. Cl.[7] .............................. H04K 1/00; H04L 9/00; G06F 17/30; G06F 7/00; G06F 12/00
(52) U.S. Cl. .................. 713/183; 713/185; 713/183; 713/168; 713/171; 713/182; 380/259; 380/280; 380/277; 380/278; 380/30; 380/284; 707/9; 707/201; 707/203
(58) Field of Search ........................ 713/183, 185, 713/186, 168, 171, 182, 193; 380/259, 260, 277, 278, 283, 284, 286, 30; 707/203, 9, 201

(56) References Cited

U.S. PATENT DOCUMENTS 5,142,578 A    8/1992  Matyas et al. .............. 380/280

(List continued on next page.)

OTHER PUBLICATIONS

Bruce Schneier, Applied Cryptography, 1996, John Wiley & Sons, Inc., Second Edition, pp. 31–32 and pp. 566–571.*

(List continued on next page.)

Primary Examiner—Kim Vu
Assistant Examiner—Allen S Wu
(74) Attorney, Agent, or Firm—Altera Law Group; Mark C. McCabe

(57) ABSTRACT

A multi-stage login procedure and system involves a first stage in which a login ID and a public key (encrypted) is transmitted from a client computer to a server computer and a key-exchange key (encrypted) is provided from the server computer to the client computer. In a second stage, a first split symmetric key and a server authentication string is generated and encrypted by the client computer and then transmitted to the server computer. In addition, the server computer generates a second split symmetric key and combines the same with the first split symmetric key to obtain a complete symmetric key for encrypting further communications from the server to the client computer. The server also generates a client authentication string, encrypts the same and transmits the encrypted string, the server authentication string (encrypted and incremented) and the second split symmetric key (encrypted) to the client computer. In a third stage, the client computer uses the server authentication string to authenticate the server. In addition, the client computer combines the second split symmetric key with the first split symmetric key to obtain the complete symmetric key for encrypting further communications from the client computer to the server computer. The client computer also decrypts, increments and encrypts the client authentication string and transmits the same to the server. The server then uses the client authentication string (after decryption and decrementation) to authenticate the client computer. Thereafter, the server provides the client computer with a first split symmetric persistent storage key (encrypted), which the client computer combines (after decryption) with a one-way hash value to obtain a persistent storage key for use by the client computer to communication information to and from persistent storage.

16 Claims, 8 Drawing Sheets

U.S. PATENT DOCUMENTS

| | | | |
|---|---|---|---|
| 5,237,611 A | | 8/1993 | Rasmussen et al. ......... 380/284 |
| 5,418,854 A | | 5/1995 | Kaufman et al. ........... 713/156 |
| 5,584,022 A | | 12/1996 | Kikuchi et al. ................ 707/9 |
| 5,748,735 A | | 5/1998 | Ganesan ..................... 713/165 |
| 5,774,551 A | * | 6/1998 | Wu et al. ................... 713/155 |
| 5,867,577 A | * | 2/1999 | Patarin ........................ 705/67 |
| 5,937,063 A | | 8/1999 | Davis ......................... 713/187 |

OTHER PUBLICATIONS

Microsoft Press, Computer Dictionary, 1997, Microsoft Corp., Third Edition, p. 469.*

IBM Technical Disclosure Bulletin, Preserving Unique Key for Window Procedures, Mar. 1992, vol. 34.*

* cited by examiner

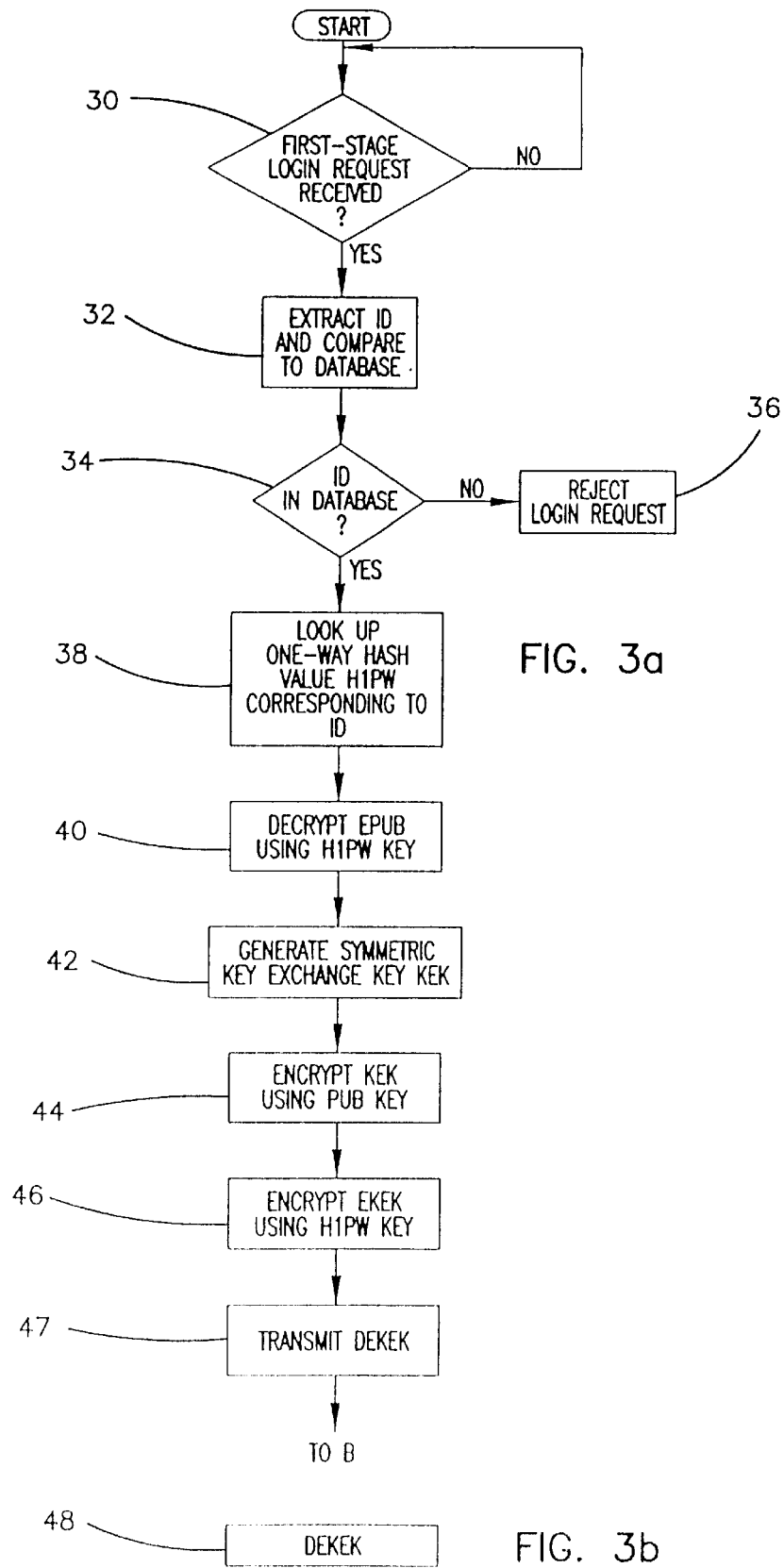

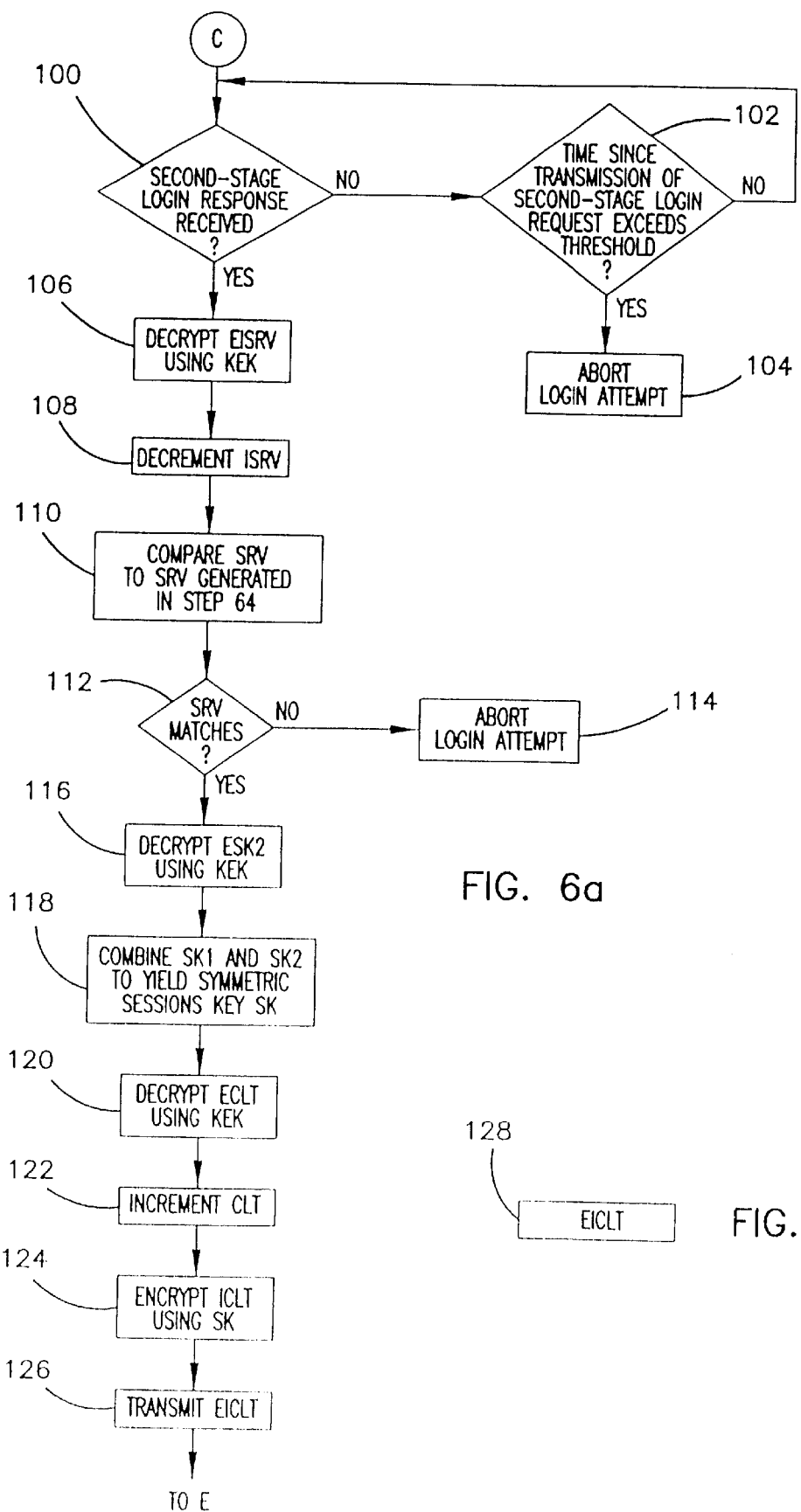

SECURITY METHOD AND SYSTEM FOR PERSISTENT STORAGE AND COMMUNICATIONS ON COMPUTER NETWORK SYSTEMS AND COMPUTER NETWORK SYSTEMS EMPLOYING THE SAME

This application is a continuation of application Ser. No. 08/988,850, filed Dec. 11, 1997 now U.S. Pat. No. 6,185,685. The application is incorporated herein by reference.

CROSS-REFERENCE TO RELATED APPLICATIONS

This application is related to the following co-pending and commonly assigned patent application, which is incorporated herein by reference:

Application Ser. No: 08/988,850 now U.S. Pat. No. 6,185,685, entitled "Security Method and System for Persistent Storage and Communications on Computer Network Systems and Computer Network Systems Employing the Same" filed on same date herewith by Stephen P. Morgan and Lance W. Russell, attorney's docket number AM9-97-052.

BACKGROUND OF THE INVENTION

1. Field of the Invention

The present invention relates, generally, to security methods and systems for persistent storage and data communications on computer networks, and computer network systems employing the same.

2. Description of Related Art

Data security has become increasingly more important as modern society and industry becomes more reliant on computer-based transactions and communications. Such transactions and communications often involve the transfer of sensitive, confidential or proprietary data on a computer network system, between multiple user computer terminals or between user terminals and server computers.

Network security measures often involve the storage of such sensitive, confidential or proprietary data in highly secure network server computers, with tight control of access to the server computer database. However, even with such security measures, the inherent operating characteristics of typical network systems can render them susceptible to unauthorized access of data.

In typical network systems, multiple authorized users (or clients) communicate over, and have access to, a common communication network. In many computing applications, data that might be sensitive, confidential or proprietary, must be communicated over the common network, for example, between a server computer and an authorized user (client) computer terminal. As a result, there is a concern that data being communicated to or from a particular authorized network user (client) may be accessed, or even altered, by unauthorized users having access to the same network. Such susceptibility to unauthorized access of data transmissions has resulted in an increased need, in many industries, to maximize network transmission security.

Another potential network security issue involves unauthorized access of data stored in "persistent" storage means at a client terminal (the contents of which persists after the computer terminal is turned off). Some examples of such persistent storage include, but are not limited to, magnetic disk drives, including sealed drives, floppy drives, and removable (cartridge) drives; magneto-optical disk drives; optical disk drives; non-volatile, random access memory (NVRAM); and FLASH read-only memory (ROM). Of course, other means for providing persistent storage exist, and embodiments of the present invention apply to those as well.

In many computing applications, sensitive, confidential or proprietary data must be downloaded (or otherwise entered) in a client's terminal. Indeed, a client might intentionally, or even inadvertently, store such data in a persistent storage means associated with the client's terminal, for example, in the course of running a particular application. This raises a concern that unauthorized persons might gain access to that persistent storage means and the data stored therein, for example, after the client has turned off and left the terminal.

Thus, conventionally, data stored on network computers has often been vulnerable to compromise, as has data being downloaded from server computers to client computers on the network, or being uploaded from client computers to server computers. Moreover, these security concerns have been heightened in contexts in which, for example, networked client terminals were located in areas that were physically less secure than a secure server computer area, or data was transmitted over an unsecure network or a public network such as the Internet.

To minimize the concern about unauthorized access to data stored at network client terminals, some network systems are designed to minimize or eliminate the persistent storage capability at the client terminal. Thus, some network client terminals have been designed with only enough persistent storage capability to store, for example, an operating program for initiating communications with, and downloading further operating software, applications or data from a network server computer. In this regard, network client terminals may be designed to store minimal or no sensitive data, in a persistent storage means.

However, further security issues are raised by network systems in which network client computer terminals with little or no persistent storage means must run an initial control program sufficient to contact one or more servers and request that the servers download programs and/or data to the client computer. When turned on, such client computers load and start their initial control program, which is typically stored within read-only memory (ROM) means. The initial control program is generally capable of initializing and controlling the communication hardware of the client computer terminal, enabling the client terminal to download its regular control program from the server. Although the client computer may attempt to download its regular control program, further security issues arises from the concern that another computer connected to the network may intercept and alter the control program as it is being downloaded, thereby gaining control over the client computer terminal.

If security concerns regarding such persistent storage could be sufficiently minimized, it would be advantageous for network client terminals to be designed to include (or operate with) persistent storage means local to the client terminal. For example, persistent storage may be used to cache control programs for the client computer, thus relieving communication traffic and security risks associated with downloading such control programs from server computers. Persistent storage may be used to cache data downloaded from a server computer, thus relieving communication traffic and security risks associated with downloading of the same data a multiple number of times to the same client terminal. Portable persistent storage may be used to hold control programs and/or data associated with a particular client of a pool of client computers, such as configuration parameters and preferences, or user-private data, that could be carried by the client, from network terminal to network terminal.

Moreover, it would also be advantageous to minimize the above-noted security concerns relating to the transmission of data between client computers and server computers. For example, if such security concerns could be minimized, control programs for network client computers could be simplified, since they would be able to trust data downloaded from server computers. In addition, control programs executed on server computers could be simplified since they would be able to trust data uploaded from client computers. Furthermore, network client and server computers could trust data transmitted over public, unsecure networks such as the Internet.

SUMMARY OF THE DISCLOSURE

It is an object of preferred embodiments of the present invention to minimize the above security problems in a network computing environment.

More particularly, it is an object of preferred embodiments of the present invention to enhance security and performance in a networked computer system in a manner such that a control program downloaded from a server to an authorized user (or client) computer terminal may be protected from alteration by any other computer connected to the network.

It is an object of further preferred embodiments of the present invention to provide the capability to store a control program or data for a client computer terminal on persistent storage directly accessible to the client terminal, but protected from access or alteration by unauthorized users, thus minimizing (or, more preferably, eliminating) the need to download a control program or sensitive data from a server to the client terminal.

It is an object of yet further preferred embodiments of the present invention to provide the capability such that data on persistent storage directly accessible to a client computer terminal may be protected from access or alteration by unauthorized users.

It is an object of yet further preferred embodiments of the present invention to enhance security and performance in a networked computer system such that data communicated between a client computer terminal and a server may be protected from access or alteration by any other computers and/or unauthorized users.

These and other objects are accomplished according to a preferred embodiments, in which a three-stage login procedure takes place, wherein each stage involves communications to and from the client computer and the server computer. In a first stage, a login ID and a public key (encrypted) is provided from the client computer to the server computer and a key-exchange key (encrypted) is provided from the server computer to the client computer.

In a second stage, a first split symmetric key and a server authentication string is generated and encrypted by the client computer and then transmitted to the server computer. In addition, the server computer generates a second split symmetric key and combines the same with the first split symmetric key to obtain a complete symmetric key for encrypting further communications from the server to the client computer. The server also generates a client authentication string and encrypts the same. In addition, the server decrypts the server authentication string received from the client computer, modifies the decrypted string with a predetermined algorithm function (such as incrementing the string by a predetermined number, for example, one), encrypts the modified string as well as the server authentication string and transmits the same, with the client authentication string (encrypted) and the second split symmetric key (encrypted) to the client computer.

In a third stage, the client computer uses the server authentication string to authenticate the server (after decryption and application of the inverse algorithm function). In addition, the client computer combines the second split symmetric key with the first split symmetric key to obtain the complete symmetric key for encrypting further communications from the client computer to the server computer. The client computer also decrypts the client authentication string, modifies the string by applying a predetermined algorithm function to the decrypted string (such as incrementing the string by a predetermined number, for example, one), encrypts the modified client authentication string and transmits the same to the server. The server then uses the client authentication string (after decryption and application of the inverse algorithm function) to authenticate the client computer. Thereafter, the server provides the client computer with a first split symmetric persistent storage key (encrypted), which the client computer combines (after decryption) with a one-way hash value to obtain a persistent storage key for use by the client computer to communication information to and from persistent storage.

In this manner, a common symmetric key is obtained by the server and the client computers for communication therebetween and a second symmetric key is obtained by the client computer for communication to and from persistent storage. In addition, an authentication string is provided to the server computer for authentication client computer and, a further authentication string is provided to the client computer for authication of the server computer. Moreover, every communication of keys, split keys and authentication strings is encrypted before transmission between server and client computers.

Thus, virtually all communications between the client computer and the server may be encrypted. Moreover, both the client-provided password and the server-generated keys and split keys are needed to establish and complete a communication link between a client computer and the server computer. Furthermore, encrypted data and/or operating programs may be stored in persistent storage at the client computer location, while encryption and decryption keys are stored in secure storage associated with the server and provided to a client only after authentication.

BRIEF DESCRIPTION OF THE DRAWINGS

Embodiments of the present invention are described herein with reference to the accompanying drawings, wherein like numerals correspond to like features in the drawings.

FIG. 2b represents a first-stage login request transmitted by a client computer, upon performance of steps shown in the flow chart of FIG. 2a.

FIG. 3a is a flow chart representing the portion of a first stage of a login process carried out by a server computer on the network system of FIG. 1.

FIG. 3b represents a first-stage login response transmitted by a server computer, upon performance of steps shown in the flow chart of FIG. 3a.

FIG. 4a is a flow chart representing the portion of a second stage of a login process carried out by a client computer on the network system of FIG. 1.

FIG. 4b represents a second-stage login request transmitted by a client computer, upon performance of steps shown in the flow chart of FIG. 4a.

FIG. 5a is a flow chart representing the portion of a second stage of a login process carried out by a server computer on the network system of FIG. 1.

FIG. 5b represents a second-stage login response transmitted by a server computer, upon performance of steps shown in the flow chart of FIG. 5a.

FIG. 6a is a flow chart representing the portion of a third stage of a login process carried out by a client computer on the network system of FIG. 1.

FIG. 6b represents a third-stage login request transmitted by a client computer, upon performance of steps shown in the flow chart of FIG. 6a.

FIG. 7a is a flow chart representing the portion of a third stage of a login process carried out by a server computer on the network system of FIG. 1.

FIG. 7b represents a third-stage login response transmitted by a server computer, upon performance of steps shown in the flow chart of FIG. 7a.

FIG. 8 is a flow chart representing steps performed by a client computer, following the transmitting step in FIG. 6a.

DETAILED DESCRIPTION OF PREFERRED EMBODIMENTS

The following detailed description is of the best presently contemplated mode of carrying out the invention. This description is not to be taken in a limiting sense, but is made merely for the purpose of illustrating general principles of the invention. The scope of the invention is best defined by the appended claims.

As noted above, the present invention relates, generally, to security methods and systems for securing persistent storage and data communications for computer networks, and computer network systems employing the same.

Figure 1:
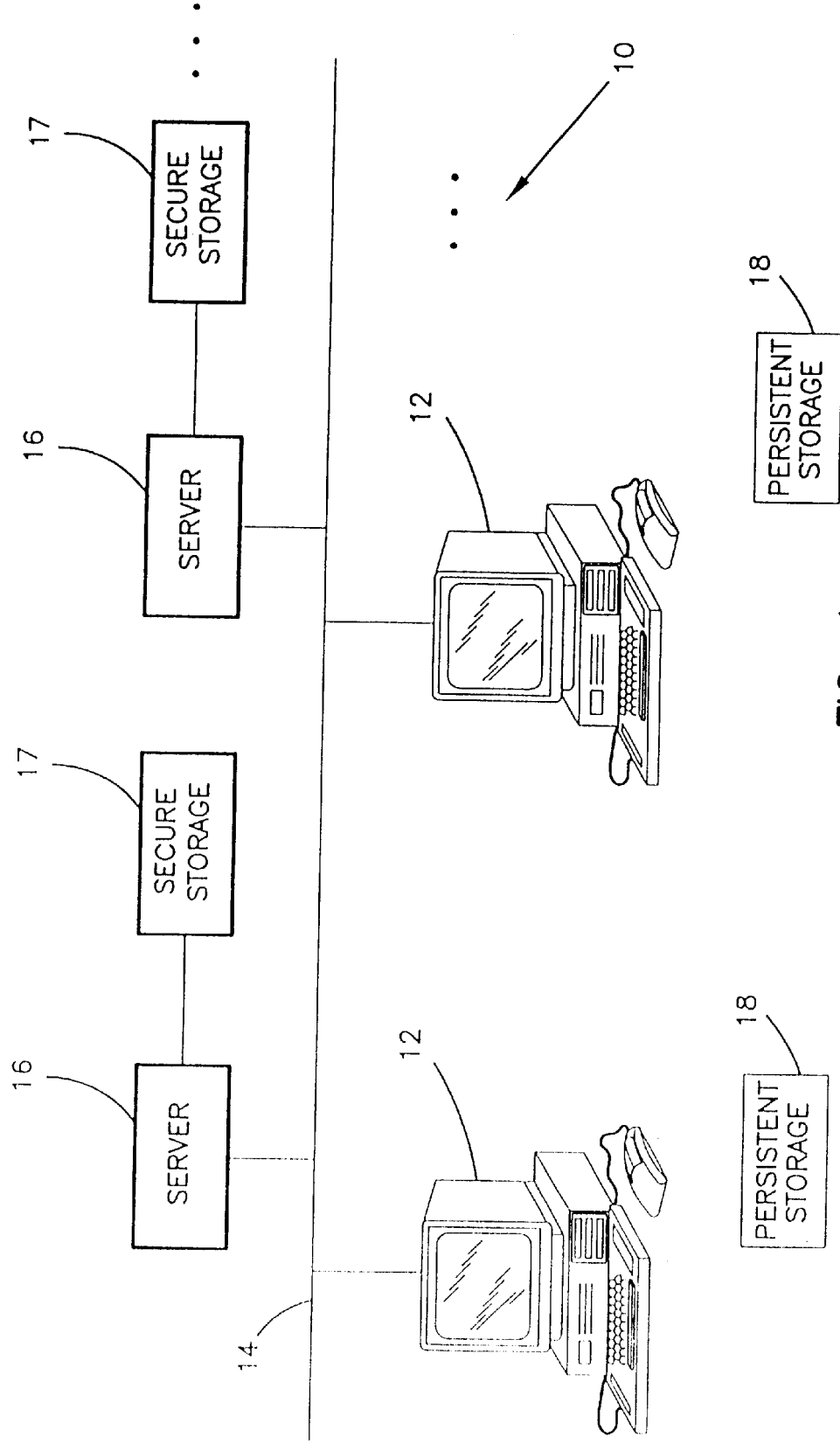
FIG. 1 is a block diagram representing a network system which may be operated in accordance with preferred embodiments of the present invention.

With reference to FIG. 1, a computer network system 10, in accordance with preferred embodiments of the present invention, includes one or more (and preferably a plurality of) client computers 12 operatively connected to a communication link 14. In preferred embodiments, the client computers 12 comprise networked client computer terminals. Two such terminals are shown in FIG. 1. However, it will be understood that network systems according to further embodiments may include more than two client computers 12. Generally, the computer programs which implement the preferred embodiment of the invention may be embodied in or readable from a computer-readable medium or carrier, e.g., one or more of the fixed and/or removable data storage data devices and/or data communications devices connected to the computer. The computer programs comprise instructions which, when read and executed by computer, cause the computer to perform the steps necessary to execute the steps or elements of the present invention.

Preferably, the network also includes one or more (and preferably a plurality of) server computers 16 also operatively connected to the communication link 14. Two such server computers are shown in FIG. 1. However, it will be understood that network systems according to further embodiments may include more than two server computers 16. Each server computer operates with a persistent storage means 17, for example, of the type noted above, but maintained in a secure environment to avoid unauthorized access of data stored therein. The communication link 14 may include a public network, such as the Internet, a local area network, or any other suitable communications connection, hardwired, wireless, or a hybrid thereof.

Also in accordance with preferred embodiments, each client computer 12 operates with, and may directly access, an associated persistent storage means 18 (for example, of the type identified above) and the information stored therein, hereinafter called persistent information. In preferred embodiments as illustrated in FIG. 1, each client computer 12 is directly coupled to an associated persistent storage means 18 local to the client computer. In further embodiments, more than one client terminal may share one or more common persistent storage means.

In preferred embodiments, persistent storage means that are directly accessible to a client computer, are used in conjunction with a communication procedure using asymmetric and symmetric key encryption (as discussed in more detail below), to achieve various advantages related to the above-discussed advantages.

In general, asymmetric key encryption involves two bit strings K1 and K2 and two asymmetric key operators, such as, but not limited to, Rivest-Shamir-Adelman (RSA) asymmetric key operators '+' and '*', applied to an arbitrary bit string A, such that (using the above-noted '+' and '*' operators as an example):

$$(A+K1)*K2=A=(A+K2)*K1.$$

It has been found that the bit stream A is costly to computer solely from knowledge of K1 and/or (A+K1) and/or (A+K2). In addition, it has been found that K2 is costly to computer solely from knowledge of A and/or K1 and/or (A+K1) and/or (A+K2). Two well-known examples of asymmetric key encryption which may be employed with preferred embodiments of the present invention are Diffie-Hellman (DH) and RSA. However, further embodiments of the present invention may employ other asymmetric key encryption techniques and asymmetric key operators consistent therewith.

Symmetric key encryption generally involves a bit string K and a symmetric key encryption operator, such as, but not limited to, the U.S. Data Encryption Standard (DES) operator '&', applied to an arbitrary bit string A, such that (using the above-noted '&' operator as an example):

$$(A \ \& \ K) \ \& \ K = A.$$

It has been found that A is costly to compute solely from knowledge of (A & K). It has also been found that K is costly to compute solely from knowledge of (A & K). One well-known example of key symmetric key encryption which may be employed with preferred embodiments of the present invention is the DES. However, further embodiments of the present invention may employ other symmetric key encryption techniques and symmetric key operators consistent therewith.

In accordance with preferred embodiments of the present invention, to initiate communications between a client computer and a server computer on a network, a security operation is carried out using both asymmetric and symmetric key encryption techniques. Preferred embodiments involve a multi-stage login security procedure, carried out using a login control program stored, for example, on the persistent memory associated with the client computer. In preferred embodiments, the client computer is not able to access a further control program, until a successful login procedure has been carried out. In this regard, further control programs needed to run the client computer may be stored in the persistent storage means in encrypted form, wherein a key for decrypting the encrypted control program is provided to the client computer from a server computer during or after a successful login procedure, as described below. As an alternative to storing an encrypted control program in the client computer's associated persistent storage means, the server computer may provide the control program to the client computer during or following a successful login procedure.

In preferred embodiments, the multi-stage login procedure involves the generation and communication of key data to and from the client and server computers, such that a common sessions key SK is established at the client and server computers for communications therebetween. In further preferred embodiments, the multi-stage login procedure also involves the generation of a persistent storage key PK for the client computer to use to encrypt and decrypt information stored in the persistent storage means associated therewith. In yet further preferred embodiments, the multi-stage login procedure also involves the authentication of the client computer to the server computer and, in yet further preferred embodiments, the authentication of the server computer to the client computer.

One example of a multi-stage login procedure which accomplishes all of the above procedures is described herein, with reference to FIG. 2a through FIG. 8, in the form of a three-stage login procedure, wherein each stage involves communications to and from the client computer and the server computer. In this regard, each stage of the login process according to such preferred embodiments includes a portion of the stage carried out by the client computer and a portion of the stage carried out by the server computer.

Figure 2A:
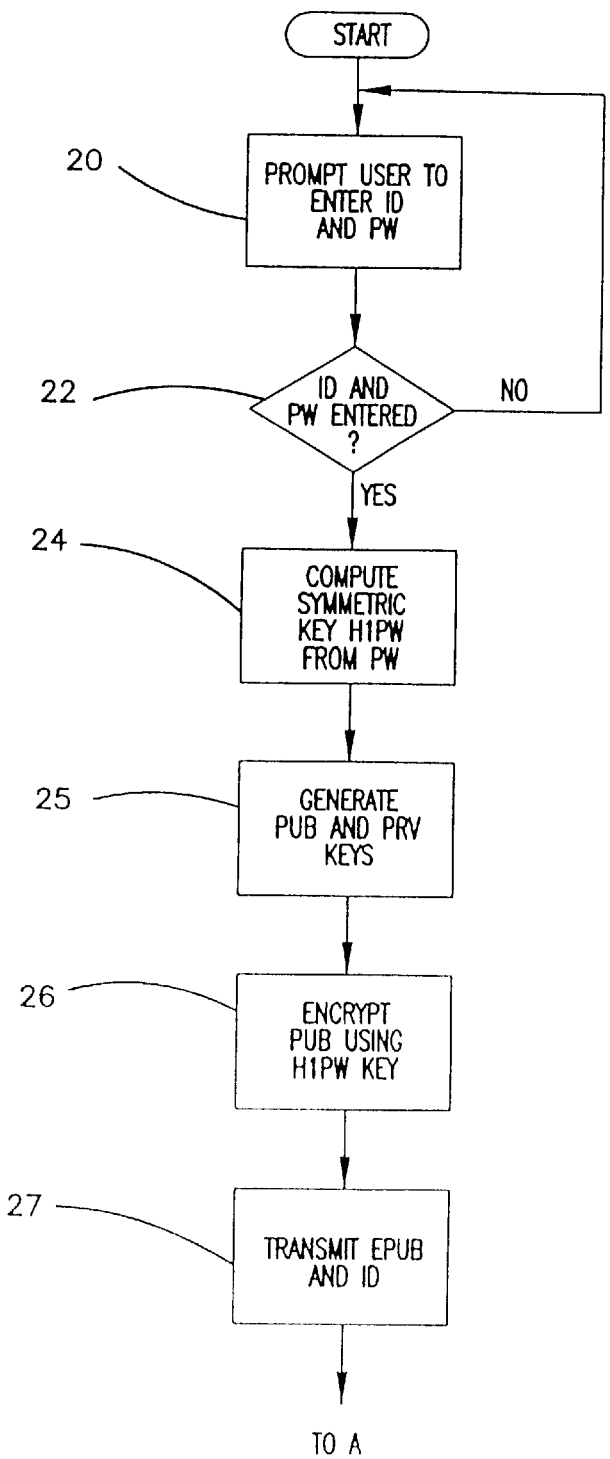
FIG. 2a is a flow chart representing the portion of a first stage of a login process carried out by an authorized user (or client) computer on the network system of FIG. 1.
Figure 2B:
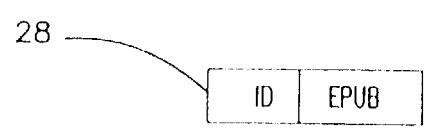
Figures 4A, 4B:
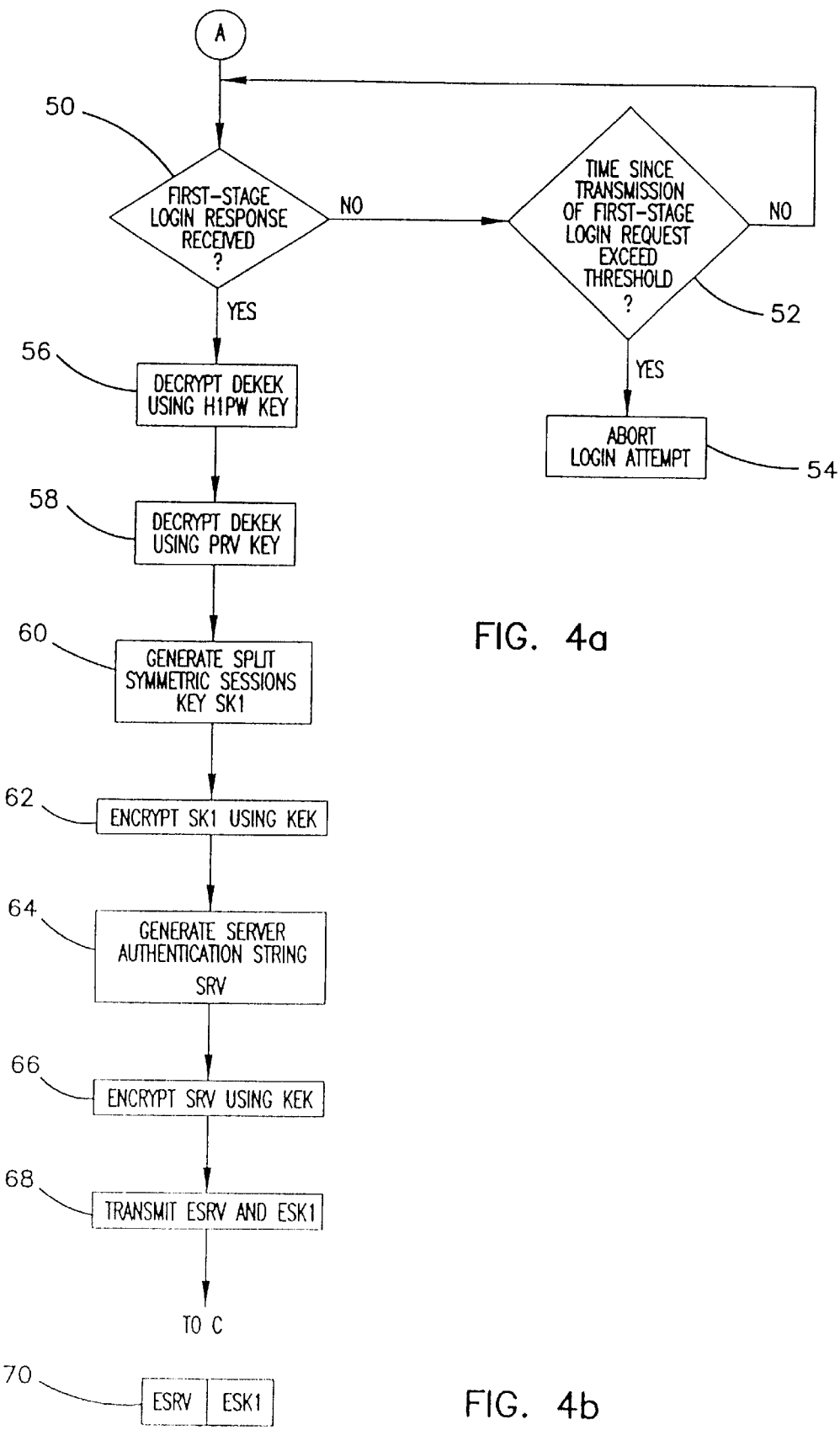
Figures 7A, 7B:
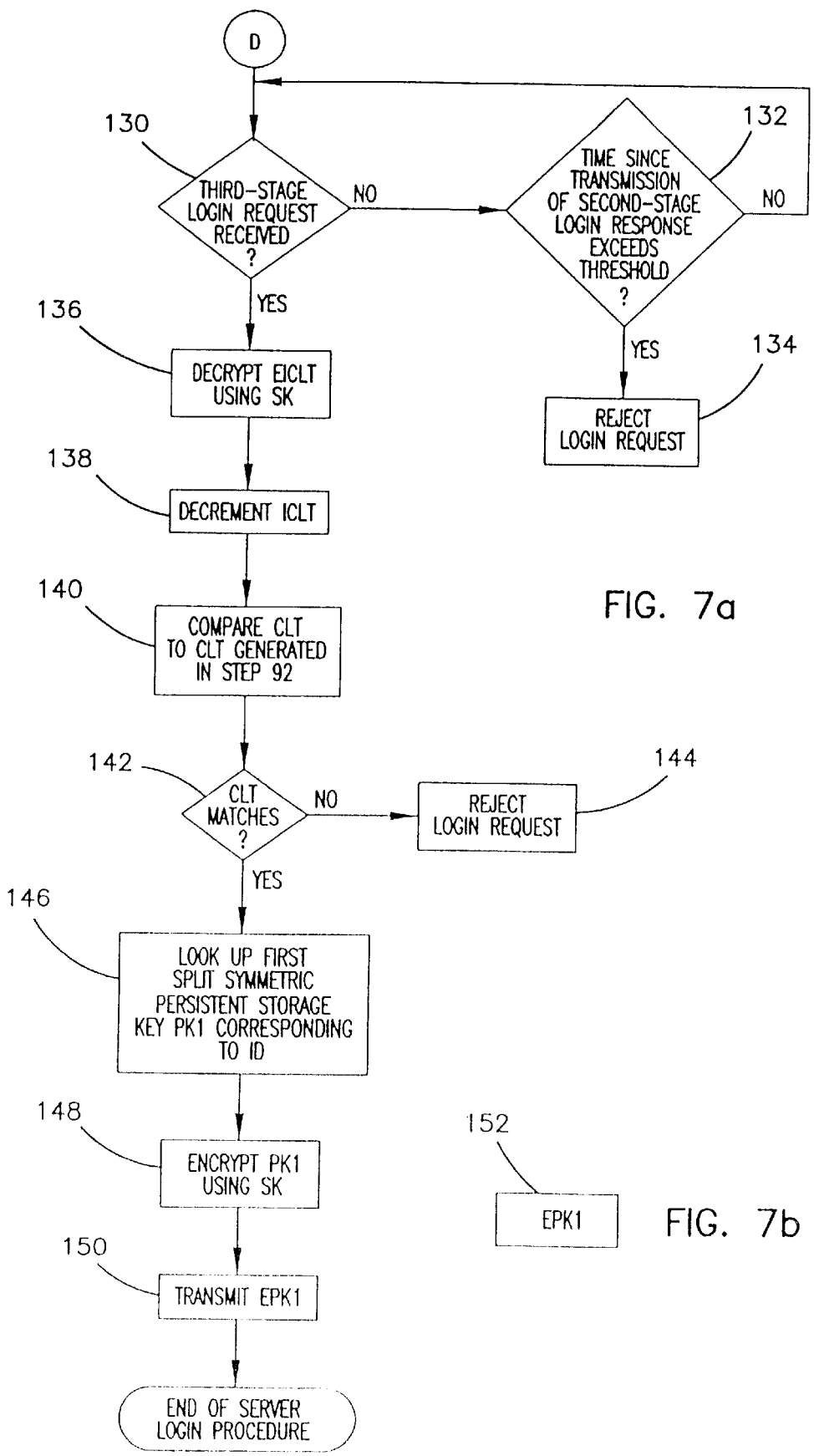
Figure 8:
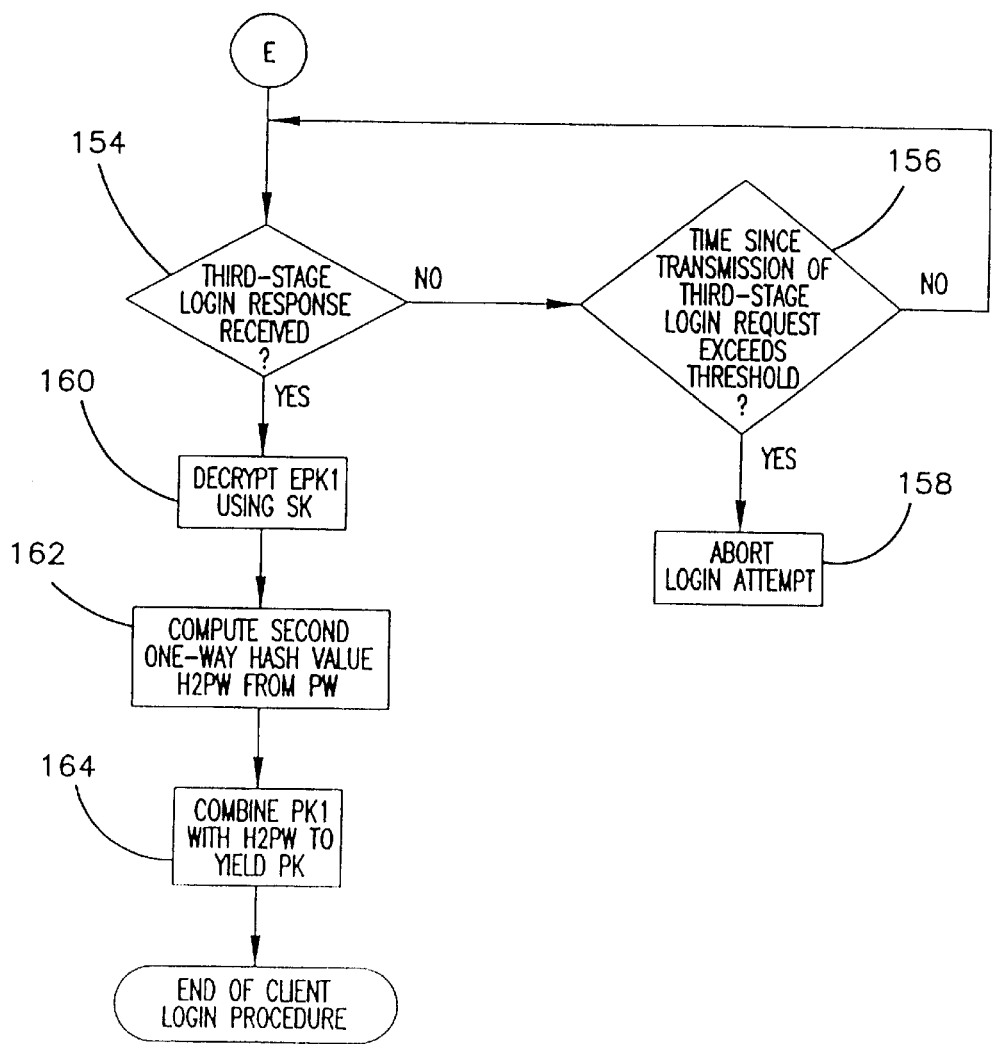

With regard to the illustrated embodiment, the first stage of the login procedure is represented by FIGS. 2a–3b, the second stage is represented by FIGS. 4a–5b, and the third stage is represented by FIGS. 6a–8. With respect to the first stage, FIG. 2a represents steps carried out by the client computer to transmit a first-stage login request (represented in FIG. 2b), while FIG. 3a represents steps carried out by the server computer to transmit a first-stage login response (represented in FIG. 3b). With respect to the second stage, FIG. 4a represents steps carried out by the client computer to transmit a second-stage login request (represented in FIG. 4b), while FIG. 5a represents steps carried out by the server computer to transmit a second-stage login response (represented in FIG. 5b). With respect to the third stage, FIG. 6a represents steps carried out by the client computer to transmit a third-stage login request (represented in FIG. 6b), while FIG. 7a represents steps carried out by the server computer to transmit a third-stage login response (represented in FIG. 7b). FIG. 8 represents steps taken by the client computer, following the steps of FIG. 6a.

As a general overview of the illustrated embodiment, the first stage involves the communication of a login ID and a public key (encrypted) from the client computer server computer and a key-exchange key (encrypted) is provided from the server computer to the client computer. In a second stage, a first split symmetric key and a server authentication string is generated and encrypted by the client computer and then transmitted to the server computer. In addition, the server computer generates a second split symmetric key and combines the same with the first split symmetric key to obtain a complete symmetric key for encrypting further communications from the server to the client computer. The server also generates a client authentication string, encrypts the same. In addition, the server decrypts the encrypted server authentication string received from the client computer, modifies the same with a predetermined algorithm function and encrypts the modified server authentication string. The server computer then transmits the server authentication string (modified and encrypted) and the second split symmetric key (encrypted) to the client computer.

In a third stage, the client computer uses the server authentication string to authenticate the server (after decryption and application of inverse algorithm function). In addition, the client computer combines the second split symmetric key with the first split symmetric key to obtain the complete symmetric key for encrypting further communications from the client computer to the server computer. The client computer also decrypts the client authentication string, modifies the decrypted string by applying a predetermined algorithm function to the decrypted string, encrypts the modified client authentication string and transmits the same to the server. The server then uses the client authentication string (after decryption and application of the inverse algorithm function) to authenticate the client computer. Thereafter, the server provides the client computer with a first split symmetric persistent storage key (encrypted), which the client computer combines (after decryption) with a one-way hash value to obtain a persistent storage key for use by the client computer to communication information to and from persistent storage.

In this manner, in accordance with the illustrated preferred embodiment, a common symmetric key is obtained by the server and the client computers for communication therebetween, and a second symmetric key is obtained by the client computer for communication to and from persistent storage. In addition, an authentication string is provided to the server computer for authentication client computer and, a further authentication string is provided to the client computer for authentication of the server computer. Moreover, every communication of keys, split keys and authentication strings is encrypted before transmission between server and client computers.

With reference to FIGS. 2a–8, a preferred embodiment is described with respect to the multiple stages of all example login procedure, as follows:

First Stage

An embodiment of the portion of a first stage of a login procedure, as carried out by the client computer, is represented by the flow chart of FIG. 2a. In particular, the login procedure may be initiated at the client computer 12, for example, upon a user entering an ID and password at the client computer terminal, preferably by manual entry through a suitable input means, such as a keyboard, card-reader, touch-screen, mouse or other suitable user-operated input device. However, further embodiments are contemplated in which identification and/or password information is automatically generated or recalled from a storage medium at the client computer. In preferred embodiments, as shown in step 20 of FIG. 2a, the client computer is controlled by the login control program to generate a prompt, requesting a user to enter an identification code (ID) and a password (PW). The ID may be, for example, specific to the particular client computer, while the PW may be specific to the particular user.

Upon recognition that an identification code ID a password PW have been entered (step 22), the password is used at the client computer 12 to compute a one-way hash value H1PW of the PW (step 24). In addition, the client computer generates, preferably by random (or pseudo-random)

generation, a public key PUB and a corresponding private key PVT (step 25). The public key PUB is encrypted, using the hash value H1PW as a symmetric key, for example, as PUB & H1PW (where '&' represents any suitable symmetric key encryption operator, including but not limited to a U.S. Data Encryption Standards operator), to yield the encrypted public key EPUB (step 26). Thereafter, a first-stage login request, composed of the login ID and EPUB is transmitted to a server computer (step 27), for example, over the network shown in FIG. 1. An embodiment of the transmitted first-stage login request is represented by reference character 28 in FIG. 2b.

The portion of the first stage of the login procedure as carried out by the server computer, in accordance with a preferred embodiment of the present invention, is represented by the flow chart of FIG. 3a. With reference to FIG. 3a, the server first determines whether or not a first-stage login request has been received (step 30). If so, then the server computer extracts the ID from the first-stage login request and uses the ID to look up the one-way hash value H1PW, which is stored in a secure persistent storage means operatively coupled to the server. For example, the ID extracted from the first-stage login request may be compared with a secure database of hash values associated with each possible ID (step 32). Preferably, the server computer determines whether or not the ID corresponds to any hash values in the database (step 34) and, if not, the login request is rejected (step 36). However, if the ID is found to correspond to a one-way hash value in the database, that hash value H1PW is obtained by the server (step 38) and is used by the server as a symmetric key to decrypt the encrypted public key EPUB (step 40), for example, as EPUB & H1PW (where '&' represents a suitable symmetric key encryption operator, such as described above).

The server computer also randomly (or pseudo-randomly) generates a symmetric key-exchange key KEK (step 42) and encrypts the same using the public key PUB, for example, as KEK+PUB (where '+' represents any suitable asymmetric key encryption operator, including, but not limited to, a Revest-Shamir-Adelman asymmetric key encryption operator), to yield the encrypted key-exchange key EKEK (step 44). The encrypted key-exchange key EKEK is then encrypted again, using the H1PW hash value as a symmetric key, for example, as EKEK & H1PW (where '&' represents a suitable symmetric key encryption operator, such as described above), to yield DEKEK (step 46). Thereafter, DEKEK is transmitted to the client computer, as a first-stage login response (step 47). The first-stage login response is represented by reference character 48 in FIG. 3b.

Second Stage

The portion of the second stage of the login procedure, as carried out by the client computer is represented in FIG. 4a. That is, after the client computer transmitted the first-stage login request (step 27 in FIG. 2a), the client computer awaits the first-stage login response 48 (FIG. 3b) transmitted from the server (step 47 in FIG. 3a). In preferred embodiments, the client computer determines whether or not a first-stage login response is received (step 50 in FIG. 4a). In further preferred embodiments, the client computer includes means for recording the period of time following the transmission of the first-stage login request (step 27 in FIG. 2a) and comparing the recorded time period with a predetermined threshold time value (step 52 in FIG. 4a). If the recorded time exceeds the threshold time value, indicating that more time has passed than would reasonably be expected for normal operation of the server, then the client computer aborts the login attempt (step 54).

On the other hand, if the client computer determines that it has received the first-stage login response prior to the expiration of the threshold period of time, the client computer then decrypts DEKEK, using H1PW as a symmetric key, for example, as DEKEK & H1PW (where '&' represents a suitable symmetric key encryption operator, such as described above), to yield EKEK (step 56). The client computer then decrypts EKEK using the PRV key, for example, as EKEK * PRV (where '*' represents a suitable asymmetric key encryption operator, such as described above), to yield KEK (step 58). As a result, both the server computer and the client computer have the key-exchange key KEK. Thus, the key-exchange key KEK may used by the server and client computers to encrypt and decrypt further key information. In that regard, further key information, preferably a split symmetric sessions key SK1, is randomly (or pseudo-randomly) generated by the client computer (step 60) and encrypted using KEK as a symmetric key, for example, as SK1 & KEK (where '&' represents a suitable symmetric key encryption operator, such as described above), to yield ESK1 (step 62) for transmission to the server.

In preferred embodiments, the process also involves authentication of the server computer to the client computer. In accordance with one embodiment for effecting such authentication, the client computer generates, preferably randomly (or pseudo-randomly), a server authentication string SRV (step 64). The client computer also includes means for, at least temporarily, storing a representation of the string SRV for a comparison operation described below. In addition, the string SRV also encrypted using KEK as a symmetric key, for example, as SRV & KEK (where '&' represents a suitable symmetric key encryption operator, such as described above), to yield ESRV (step 66).

A second-stage login request is then transmitted to the server (sep 68). For preferred embodiments in which the server authentication string is generated, the second-stage login request comprises ESRV and ESK1, as represented by reference character 70 in FIG. 4b. For embodiments in which server authentication is not carried out, the second-stage login request 70 need not include ESRV.

Figures 5A, 5B:
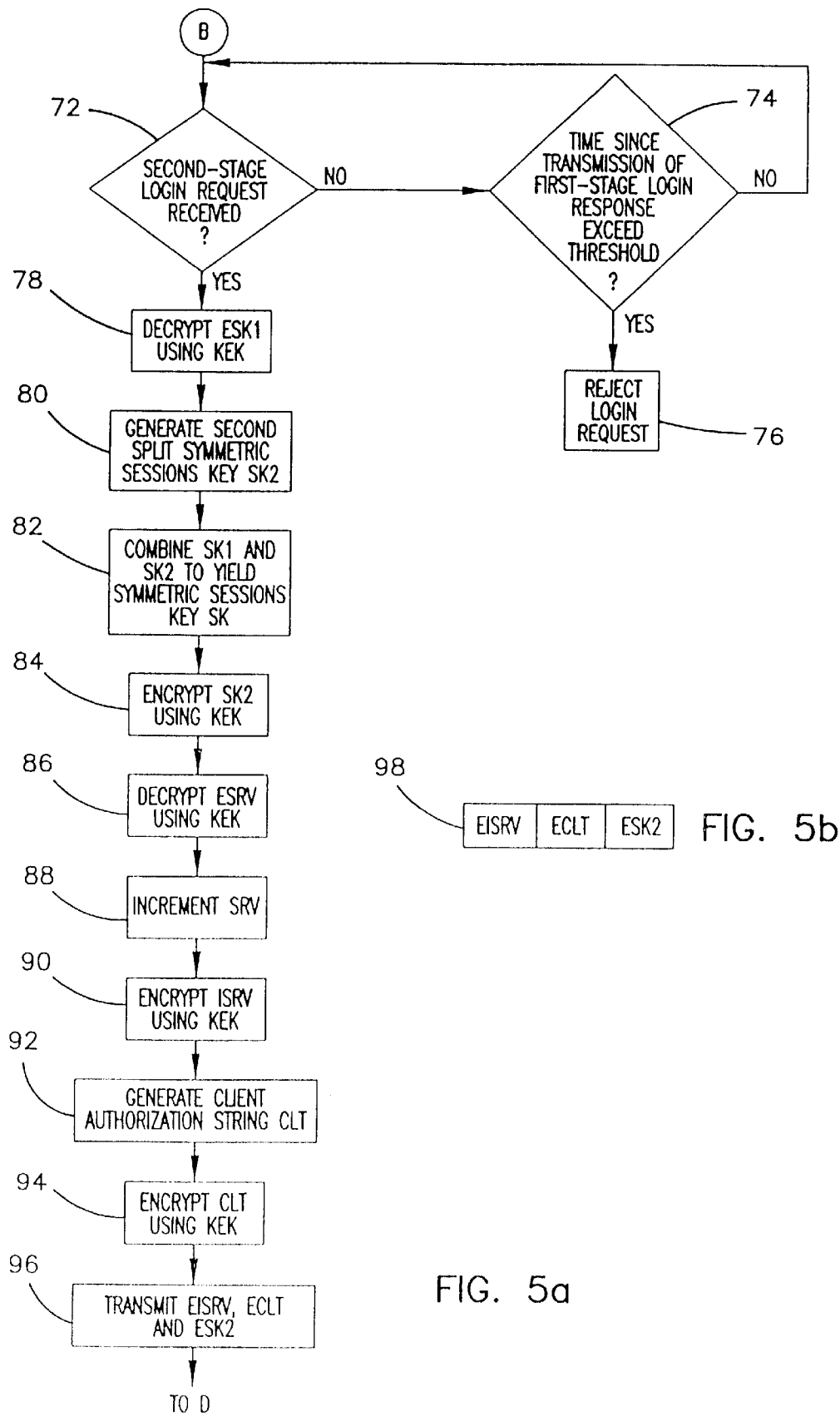

The portion of the second stage of the login procedure as carried out by the server computer, in accordance with a preferred embodiment of the present invention, is represented by the flow chart of FIG. 5a. That is, after the server computer transmitted the first-stage login response (step 47 in FIG. 3a), the server computer awaits the second-stage login request 70 (FIG. 4b) transmitted from the client computer (step 68 in FIG. 4a). In preferred embodiments, the server computer determines whether or not a second-stage login request is received (step 72 in FIG. 5a). In further preferred embodiments, the server computer includes means for recording the period of time following the transmission of the first-stage login response (step 47 in FIG. 3a) and comparing the recorded time period with a predetermined threshold time value (step 74 in FIG. 5a). If the recorded time exceeds the threshold time value before the second-stage login request is received, indicating that more time has passed than would reasonably be expected for normal operation of the client computer, then the server computer rejects the login request (step 76).

On the other hand, if the server computer determines that it has received the second-stage login request prior to the expiration of the threshold period of time, the server computer decrypts ESK1, using KEK as a symmetric key, for example, as ESK1 & KEK (where '&' represents a suitable symmetric key encryption operator, such as described above), to yield SK1 (step 78). In addition, the server generates, preferably by random (or pseudo-random) generation, a second split symmetric sessions key SK2 (step 80) and, then, combines the first and second split symmetric session keys SK1 and SK2 to yield symmetric sessions key SK (step 82). The second split symmetric sessions key SK2 is encrypted, using KEK as a symmetric key, for example, as SK2 & KEK (where '&' represents a suitable symmetric key encryption operator, such as described above), to yield ESK2 (step 84) for transmission to the client computer.

In embodiments in which server authentication is carried out, the server computer also decrypts ESRV, using KEK as a symmetric key, for example, as ESRV & KEK (where '&' represents a suitable symmetric key encryption operator, such as described above), to yield SRV (step 86). Then, the server modifies SRV in a predetermined manner, such as by applying a predetermined algorithm function F to SRV. In one preferred embodiment, the predetermined algorithm function comprises incrementing SRV by a predetermined number, for example, by one, yielding ISRV (step 88). However, in further embodiments, other suitable predetermined algorithm functions or other suitable predetermined modifications of the string SRV to yield ISRV may be employed. The server computer then encrypts ISRV using the key-exchange key KEK as a symmetric key, for example, as ISRV & KEK (where '&' represents a suitable symmetric key encryption operator, such as described above), to yield EISRV (step 90).

In further preferred embodiments, the process also involves authentication of the client computer to the server computer. In accordance with one embodiment for effecting such authentication, the server computer generates, preferably by random (or pseudo-random) generation, a client authentication string CLT (step 92). The server computer also includes means for, at least temporarily, storing a representation of the string CLT for a comparison operation described below in connection with step 140. In addition, the string CLT is also encrypted using KEK as a symmetric key, for example, as CLT & KEK (where '&' represents a suitable symmetric key encryption operator, such as described above), to yield ECLT (step 94).

A second-stage login response is then transmitted to the client computer (sep 96). For preferred embodiments in which the server authentication string is generated, the second-stage login response comprises EISRV, ECLT and ESK2, as represented by reference character 98 in FIG. 5*b*. For embodiments in which server authentication is not carried out, the second-stage login response 98 need not include EISRV. For embodiments in which client authentication is not carried out, the second stage login response 98 need not include ECLT.

Third Stage

The portion of the third stage of the login procedure, as carried out by the client computer is represented in FIG. 6*a*. That is, after the client computer transmitted the second-stage login request (step 68 in FIG. 4*a*), the client computer awaits the second-stage login response 98 (FIG. 5*b*) transmitted from the server (step 96 in FIG. 5*a*). In preferred embodiments, the client computer determines whether or not a second-stage login response is received (step 100 in FIG. 6*a*). In further preferred embodiments, the client computer includes means for recording the period of time following the transmission of the second-stage login request (step 68 in FIG. 4*a*) and comparing the to recorded time period with a predetermined threshold time value (step 102 in FIG. 6*a*). If the recorded time exceeds the threshold time value, indicating that more time has passed without receipt of the second-stage login response than would reasonably be expected for normal operation of the server, then the client computer aborts the login attempt (step 104).

On the other hand, if the client computer determines that it has received the second-stage login response prior to the expiration of the threshold period of time, then the client computer decrypts elements of the second-stage login response. In particular, for embodiments in which server authentication is effected, the client computer decrypts EISRV, using KEK as a symmetric key, for example, as EISRV & KEK (where '&' represents a suitable symmetric key encryption operator, such as described above), to yield ISRV (step 106). The client computer then un-modifies ISRV, for example, by applying the inverse algorithm function 1/F (inverse to the algorithm function applied above to modify SRV to yield ISRV). In the above-mentioned example embodiment wherein the algorithm function comprised incrementing the string SRV by a predetermined number, such as one (step 88), the inverse function comprises decrementing the modified string ISRV by said predetermined number, such as one (step 108).

The thus yielded SRV is compared to the server authentication string generated and stored by the client computer in connection with step 64 (step 110). A determination is made as to whether or not the compared SRV strings sufficiently match (step) 112) and, if not, the client computer aborts the login process (step 114). If a sufficient match is found in step 112, then the login process carries on as described below. In this manner, the client computer authenticates the server computer as being the same computer to which the client computer transmitted the SRV string in the second stage of the process.

Preferably upon successful authentication of the server, the client computer decrypts the encrypted second split symmetric sessions key ESK2, using KEK as a symmetric key, for example, as ESK2 & KEK (where '&' represents a suitable symmetric key encryption operator, such as described above), to yield SK2 (step 116). In embodiments in which server authentication is not carried out, step 116 may follow directly from the "yes" prong of step 100. The client computer then combines the first and second split symmetric sessions keys SK1 and SK2 to yield the split symmetric sessions key SK (step 118). In this manner, the client computer and the server computer possess the split sessions key SK, which may thereafter be used by both the client computer and the server computer for encrypting and decrypting further communications therebetween.

For embodiments in which client authentication is effected, the client computer decrypts ECLT, using KEK as a symmetric key, for example, as ECLT & KEK (where '&' represents a symmetric key encryption operator), to yield CLT (step 120). The client computer then modifies CLT, for example, by applying a predetermined algorithm function to CLT. In one embodiment, the predetermined algorithm function comprises incrementing CLT by a predetermined value, for example, by one, to yield ICLT (step 122). However, in further embodiments, other suitable predetermined algorithm functions or other suitable predetermined modifications of the string CLT to yield ICLT may be employed. The client computer then encrypts ICLT, using SK as a symmetric key, for example, as ICLT & SK (where '&' represents a suitable symmetric key encryption operator, such as described above), to yield EICLT (step 124).

A third-stage login request is then transmitted to the server (step 126). In embodiments in which client authentication is effected, the third-stage login request comprises the encoded, incremented, client authentication string EICLT, as represented by reference character 128 in FIG. 6b. In further embodiments in which client authentication is not effected, the third-stage login request may comprise any predefined information, encoded using SK as a symmetric key.

The portion of the third stage of the login procedure as carried out by the server computer, in accordance with a preferred embodiment of the present invention, is represented by the flow chart of FIG. 7a. That is, after the server computer transmitted the second-stage login response (step 96 in FIG. 5a), the server computer awaits the third-stage login request 128 (FIG. 6b) transmitted from the client computer (step 126 in FIG. 6a). In preferred embodiments, the server computer determines whether or not a third-stage login request is received (step 130 in FIG. 7a). In further preferred embodiments, the server computer includes means for recording the period of time following the transmission of the second-stage login response (step 96 in FIG. 5a) and comparing the recorded time period with a predetermined threshold time value (step 132 in FIG. 7a). If the recorded time exceeds the threshold time value before the third-stage login request is received, indicating that more time has passed than would reasonably be expected for normal operation of the client computer, then the server computer rejects the login request (step 134).

On the other hand, if the server computer determines that it has received the third-stage login request prior to the expiration of the threshold period of time, the server computer proceeds as follows. For embodiments in which client authentication is effected, the server computer decrypts EICLT, using SK as a symmetric key, for example, as EICLT & SK (where '&' represents a suitable symmetric key encryption operator, such as described above), to yield ICLT (step 136). Then, the server computer then unmodifies ICLT, for example, by applying the inverse algorithm function (inverse to the algorithm function applied above to modify CLT to yield ICLT). In the above-mentioned example embodiment wherein the algorithm function comprised incrementing the string CLT by a predetermined number, such as one (step 122), the inverse function comprises decrementing the modified string ICLT by said predetermined number, such as one (step 138).

The thus yielded CLT is compared to the client authentication string generated and stored by the server computer in connection with step 92 (step 140). A determination is made as to whether or not the compared CLT strings sufficiently match (step 142) and, if not, the server computer rejects the login process (step 144). If a sufficient match is found in step 142, then the login process carries on as described below. In this manner, the server computer authenticates the client computer as being the same computer to which the server computer transmitted the CLT string in the second stage of the process.

Preferably upon successful authentication of the client computer, the server computer looks up a first split symmetric persistent storage key PK1 associated with the login ID (step 146) and then encrypts the same, using SK as a symmetric key, for example, as PK1 & SK (where '&' represents a suitable symmetric key encryption operator, such as described above), to yield EPK1 (step 148). In further embodiments, step 146 may be combined with step 38, such that the first split symmetric persistent storage key PK1 is obtained as part of the look up step 38 and stored for use in step 148. Also, in embodiments in which client authentication is not carried out, step 146 or step 148 may follow directly from the "yes" prong of step 130.

A third-stage login response is then transmitted to the client (step 150). The third-stage login response comprises the encoded, first split symmetric persistent storage key PK1, as represented by reference character 152 in FIG. 7b. As discussed below, the, first split symmetric persistent storage key PK1 is used by the client computer to generate a symmetric key for the client computer to use to encrypt and decrypt information communicated to and from persistent storage.

In particular, after the client computer transmitted the third-stage login request (step 126 in FIG. 6a), the client computer awaits the third-stage login response 152 (FIG. 7b) transmitted from the server (step 150 in FIG. 7a). In preferred embodiments, the client computer determines whether or not a third-stage login response is received (step 154 in FIG. 8). In further preferred embodiments, the client computer includes means for recording the period of time following the transmission of the third-stage login request (step 126 in FIG. 6a) and comparing the recorded time period with a predetermined threshold time value (step 156 in FIG. 8). If the recorded time exceeds the threshold time value, indicating that more time has passed without receipt of the third-stage login response than would reasonably be expected for normal operation of the server, then the client computer aborts the login attempt (step 158).

On the other hand, if the client computer determines that it has received the third-stage login response prior to the expiration of the threshold period of time, then the client computer decrypts EPK1, using the SK as a symmetric key, for example, as EPK1 & SK (where '&' represents a suitable symmetric key encryption operator, such as described above), to yield the first split symmetric persistent storage key PK1 (step 160). In addition, the client computer computes a second one-way hash value H2PW from the password PW (step 162), which is then combined with the first split symmetric persistent storage key PK1 to yield persistent storage key PK (step 164). Alternatively, step 162 may be carried out during during step 24, when the client computer computes the first one-way hash value H1PW, and stored for use in step 164. As a further alternative, a second split symmetric persistent storage key PK2 may be generated and then combined with PK1 to yield PK, where PK2 is generated by any suitable means, including, but not limited to prompting the user for a second password corresponding to PK2, by reading a token corresponding to PK2 from, for example a pre-encoded smart card, or by reading biometric data such as a fingerprint, voice pattern or retina scan and looking up PK2 in a database record corresponding to the second password, token or biometric data.

Following the above process, the symmetric key SK is used by the server computer, and the client computer to encrypt and decrypt communications therebetween. In addition, the client computer uses the persistent storage key PK to encrypt and decrypt data written to and from persistent storage.

Pursuant to the above-discussed process, significant advantages are achievable, with respect to security issues relating to persistent storage at the client computers. More specifically, encrypted persistent information remains encrypted when the client computer is off, or when the persistent storage containing said persistent information is removed from the client computer.

Thus, client computers may be provided with (and directly access) persistent storage devices, with confidence in the security of storing data and/or control programs for the client computer on the persistent storage, in that the data and control programs may be encrypted and, thus, protected from access or alteration by unauthorized users. Thus, sensitive data may be stored on persistent storage for direct access by the client computer, minimizing the need to download such data over the network from a server. In addition, the client computer need not download a control program from a server.

Alternatively, in accordance with further preferred embodiments, once login procedures are carried out, the client computers may load further control programs or data from secure persistent storage and/or secure communication networks associated with the server with which login took place. Thus, the security controls associated with the login and authentication procedures provide confidence that the control programs or data downloaded from the server are correct and secure.

In addition, significant advantages are achievable with respect to security issues relating to the transmission of sensitive information over a network communication link, in that all communications between the client computer and the server computer are encrypted. In this manner, data communicated between a client computer and a server may be protected from access or alteration by any other computers and/or unauthorized users.

In further preferred embodiments, security may be enhanced by programming the client computer and/or server computer to reject symmetric sessions key SK after a fixed time, or after a certain number of accesses to secure data, or when certain highly sensitive or secret data is to be accessed, forcing the client computer and server computer to reauthenticate.

In preferred embodiments discussed above, an algorithm function F and inverse function 1/F are employed for coding and decoding the server and client authentication strings. In one embodiment, F may be an invertible function. However, in further embodiments F may be applied by any suitable means including, but not limited to, a "SmartCard" computing device. The SmartCard would be passed an authentication string, would apply a function F to the string, and would pass the result back. Function F may be an encryption method (whereas 1/F would be the corresponding decryption method), using a key stored on the SmartCard, but not directly accessible outside of the SmartCard. Thus, the ability to encrypt the string implies that the user has possession of the SmartCard. If F is an encryption method, it may be either symmetric, in which case the server must be aware of the encryption/decryption key, or asymmetric, in which case the server must be aware only of the decryption key. The latter case effectively uses an invertible function for authentication.

The presently disclosed embodiments are to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A secure login method to enhance security in a network computer system having at least one server computer coupled over a communication network to a plurality of client computers comprising:

sending a login request and an encrypted public key form a first processor to a second processor to obtain KEK from the second processor, first and second processor communicating to generate a session key for use in privately encrypted communication between the first and second processor, wherein the sending of the login request and the encrypted public key from the first processor comprises computing a hash value using a user password and encrypting the public key with the hash value; and first and second processor communicating to generate a persistent storage key for use in communicating with persistent storage, wherein the first and second processor communicating to generate the persistent storage key for use in communicating with persistent storage further comprises locating the first split persistent storage key at the second processor and sending the first split persistent storage key to the first processor, wherein a second split persistent storage key is generated at the first processor, wherein the first and second split persistent storage keys are combined at the first processor to produce a persistent storage key for communication between the first processor and a persistent storage.

2. The method of claim 1 further comprises aborting a login request at the first processor after waiting a predetermine period of time after sending the login request to the second processor.

3. The method of claim 1 further comprises decrypting the encrypted public key at the second processor, wherein the decrypting provides the public key and the hash value upon a successful authentication of the login request at the second processor, whereby the hash value is a result of the decrypting of the public key.

4. The method of claim 3 further comprises randomly generating a KEK at the second processor, encrypting the KEK with the public key and the hash value, and sending the encrypted KEK to the first processor.

5. The method of claim 4 further comprises aborting a login request at the second processor after waiting a predetermined period of time after sending a login request response to the first processor.

6. The method of claim 4, wherein the first and second processor communicating to generate a session key further comprises decrypting, at the first processor, the encrypted KEK using the hash value, and a private key.

7. The method of claim 1, wherein the first and second processor communicating to generate a session key further comprises randomly generating a first split session key at the first processor and a second split session key at the second processor, encrypting the first and second split session key with the KEK and sending the first and second split session key to the second and first processor, respectively.

8. The method of claim 7 further comprises decrypting the encrypted first split session key at the second processor, wherein the decrypting provides the first split session key and the KEK upon a successful authentication of a second login request at the second processor, whereby the KEK is a result of the decrypting of the encrypted first split session key.

9. The method of claim 7, wherein sending the first and second split session key further comprises combining the first split session key with the second split session key at the second processor to form the session key, and wherein the second split session key is encrypted with the KEK and sent to the first processor.

10. The method of claim 7, further comprises determining, at the second processor, if a randomly generated client authentication string is to be sent to the first processor, wherein the client authentication string is encrypted with the KEK.

11. The method of claim 10, further comprises determining authenticity of the client authentication string, if the client authentication string is sent to the second processor, wherein the client authentication string is decrypted.

12. The method of claim 1, further comprises determining, at the first processor, if a randomly generating a server authentication string is to be sent to the second processor, wherein the server authentication string is encrypted with the KEK.

13. The method of claim 12 further comprises decrypting the encrypted server authentication string at the second processor, wherein the decrypting provides the server authentication string and the KEK, wherein the server authentication string is modified to produce a modified server authentication string, which is encrypted and sent to the first processor, whereby the KEK is a result of the decrypting of the encrypted server authentication string.

14. The method of claim 1 further comprises decrypting the encrypted first split persistent storage key at the first processor upon a successful authentication of a third login response from the second processor.

15. The method of claim 1, wherein the generating a second split persistent storage key at the first processor further comprises generating the second split persistent storage key from a second hash value, a second password corresponding to the second split persistent storage key, or by reading a token corresponding to the second split persistent storage key.

16. The method of claim 15, wherein reading the token corresponding to the second split persistent storage key further comprises reading a pre-encoded smart card, biometric data, or a retina scan.

* * * * *